May 15 1923.

Re. 15,603

L. STEELMAN

LEER

Original Filed Nov. 19, 1914 3 Sheets-Sheet 1

INVENTOR

Louis Steelman
by his attorneys
Byrne, Stebbins & Parmelee

May 15, 1923. Re. 15,603

L. STEELMAN

LEER

Original Filed Nov. 19, 1914 3 Sheets-Sheet 2

INVENTOR

Lewis Steelman by his attorneys

Byrnes, Stebbins & Brinckerhoff

May 15, 1923. Re. 15,603

L. STEELMAN

LEER

Original Filed Nov. 19, 1914 3 Sheets-Sheet 3

INVENTOR

Lewis Steelman by his attorneys

Byrne, Stubbins & Parmele

Reissued May 15, 1923. Re. 15,603

UNITED STATES PATENT OFFICE.

LEWIS STEELMAN, OF MILLVILLE, NEW JERSEY, ASSIGNOR TO H. L. DIXON COMPANY, OF PITTSBURGH, PENNSYLVANIA, A CORPORATION OF PENNSYLVANIA.

LEER.

Original No. 1,178,549, dated April 11, 1916, Serial No. 872,021, filed November 19, 1914. Application for reissue filed March 7, 1923. Serial No. 623,531.

*To all whom it may concern:*

Be it known that I, LEWIS STEELMAN, a citizen of the United States, residing at Millville, in the county of Cumberland, State of New Jersey, have invented a new and useful Leer, of which the following is a specification.

My invention relates to a type of annealing furnaces which is especially adapted for the annealing of glass and which is commonly known in the art as a leer.

One of the objects of my invention is to devise a novel leer in which a uniform heat may be maintained throughout the length of the leer and wherein the products of combustion or the flame do not come into direct contact with the ware, the ware being annealed by the action of radiant heat which passes through the walls of the flues which latter are constructed in a novel manner.

Another object of my invention is to devise a leer in which the products of combustion pass through adjacent flues in opposite directions in order to render it possible to maintain a uniform heat throughout the length of the annealing chamber.

A further object of my invention is to devise a leer which may be fired by any desired type of fuel such as for example gas, oil or producer gas.

Another object of my invention is to utilize the waste products of combustion to preheat the air used to promote combustion.

Another object of my invention is to interlock the tiles of the flues in such a manner that the flues and arches will not break down or become displaced.

Other objects and advantages of my invention will hereinafter appear in the detail description.

With the above in view my invention in its broad and generic scope consists of a novel construction of a leer.

For the purpose of illustrating my invention I have shown in the accompanying drawing one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1:
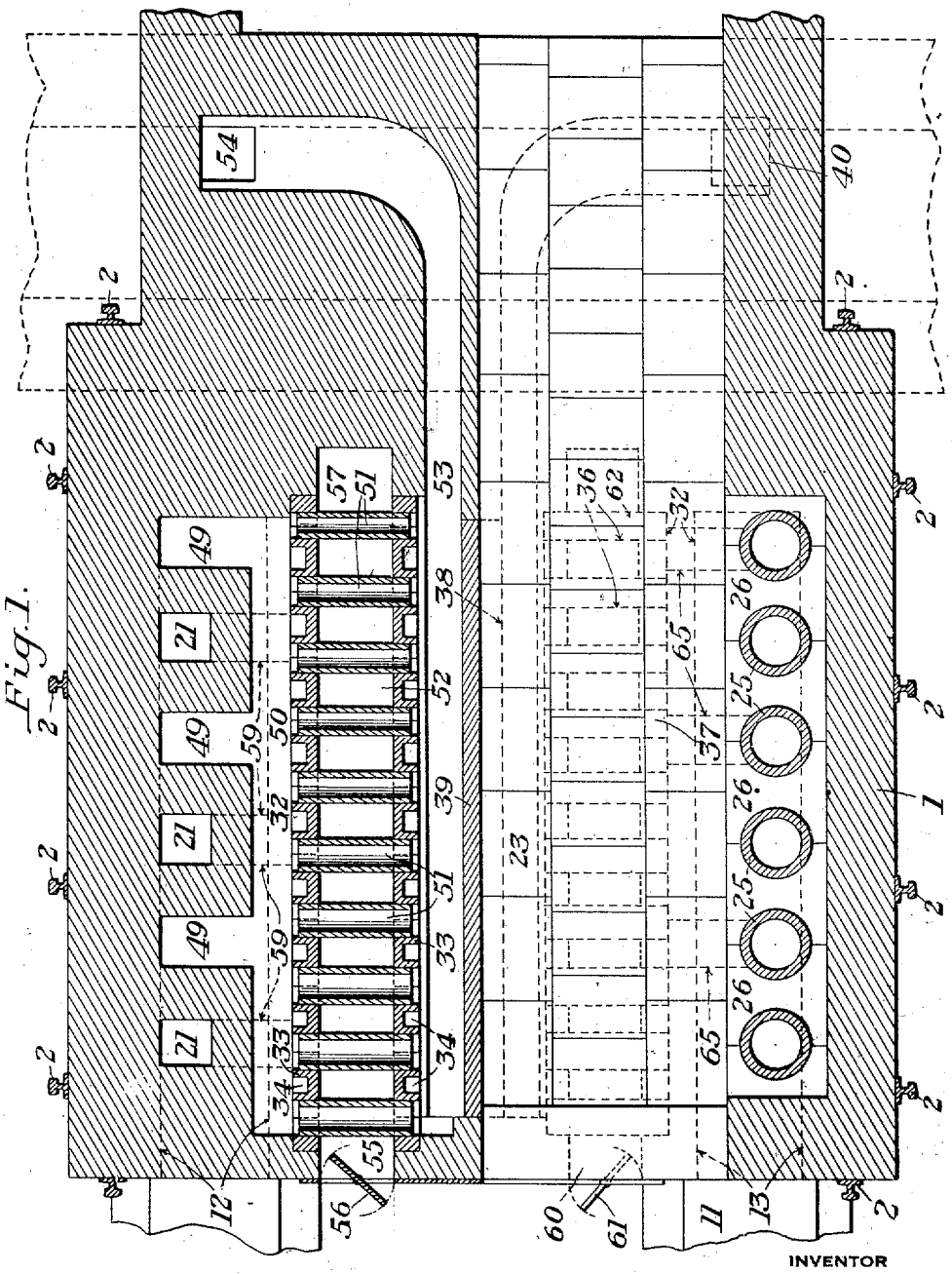
Figure 2:
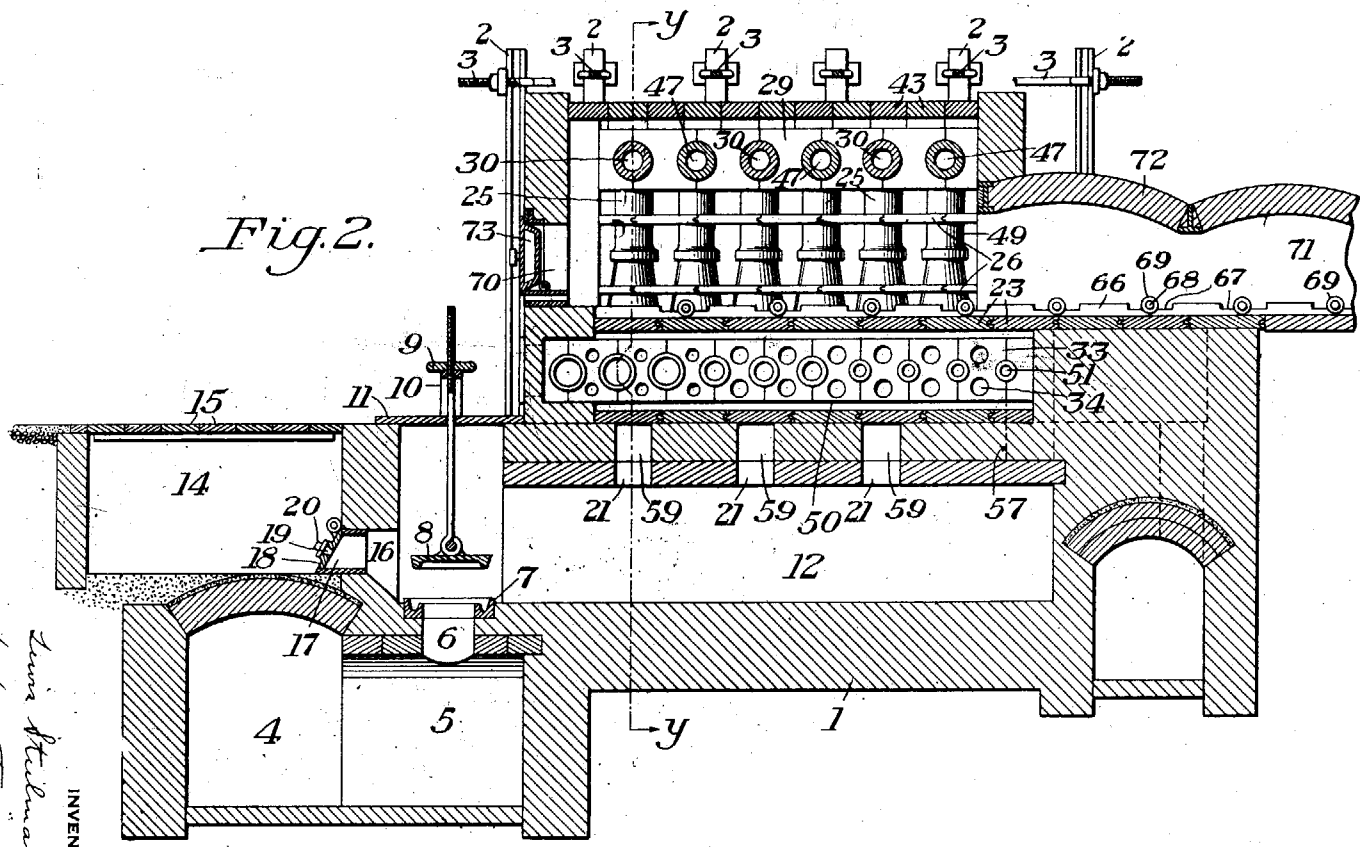
Figure 3:
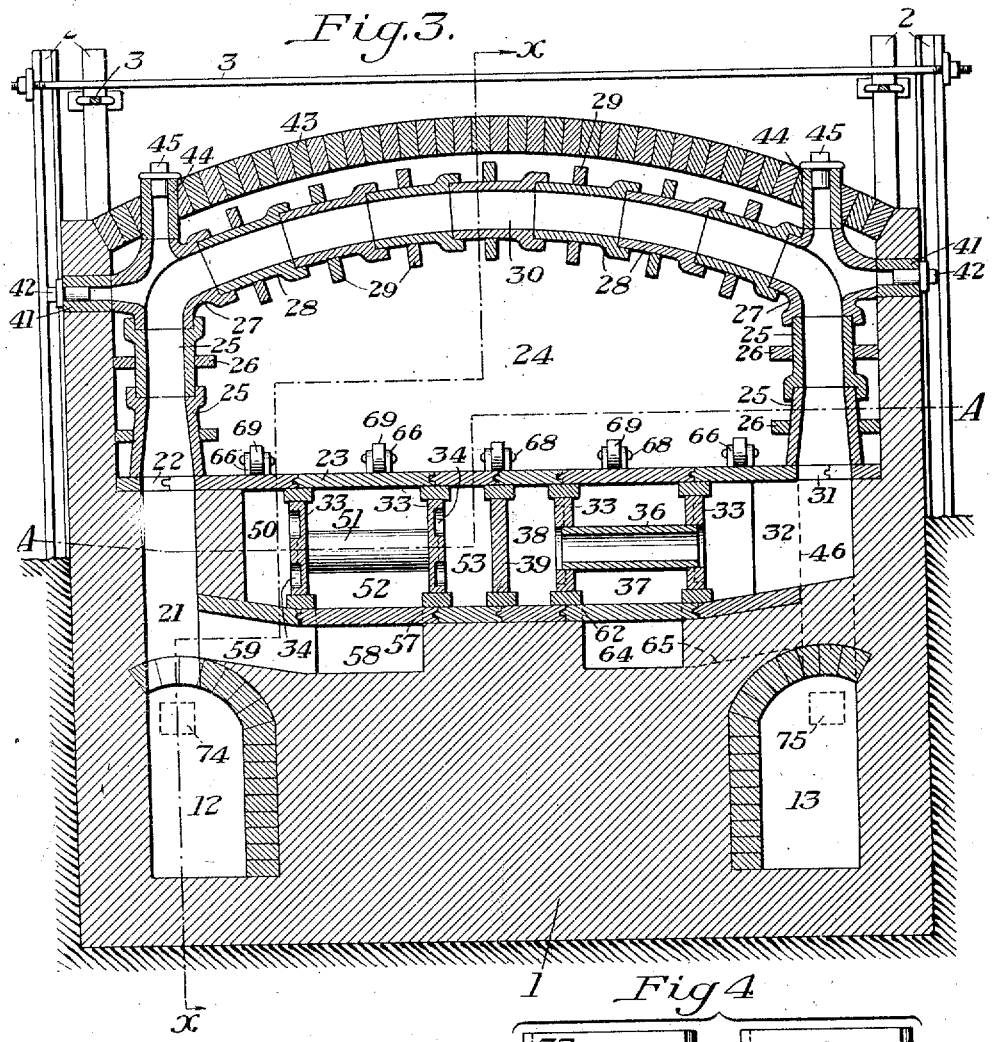
Figure 4:
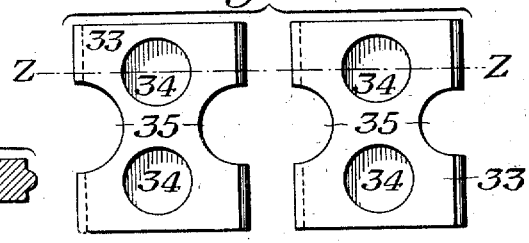
Figure 5:
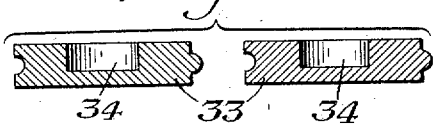

Figure 1 represents a sectional plan view, of a leer embodying my invention, the section being taken on line A—A of Figure 3, Figure 2 represents a longitudinal section taken on the line $x$—$x$ of Figure 3, Figure 3 represents a transverse section taken on line $y$—$y$ of Figure 2, Figure 4 represents a side elevation, in detached position, of certain tiles employed, and Figure 5 represents a section on line $z$—$z$ of Figure 4.

Similar numerals of reference indicate corresponding parts in the figures.

Referring to the drawings, 1 designates the framework of a leer embodying my invention, said framework being generally constructed of brick-work reinforced by standards 2 which are connected by tie-rods 3.

4 designates the main gas or fuel conduit which is provided with branch conduits 5, two of which are employed in connection with each leer and one of which is shown in Figure 2. Each branch conduit 5 has a port 6 communicating therewith, the upper end of which is surrounded by a valve-seat 7 with which a valve 8 cooperates, the stem of said valve being in threaded engagement with a manually controlled adjusting nut 9 mounted above a bracket 10 carried by the cover plate 11. It will be understood that two valve controlled ports 6 are provided one of which communicates with a conduit or flue 12 while the other of said ports communicates with a flue or conduit 13.

At the front of the leer I provide two cleaning pits 14 each of which has a removable cover 15 and are provided with ports 16 one of which communicates with the conduit 12 while the other port 16 communicates with the conduit 13. Each port 16 is provided with a valve seat 17 with which cooperates a hinged door 18 having an aperture 19 therethrough which is closed by a plug 20. The purposes of the controllable ports 19 are to provide for the burning out of the soot or other accumulations in the conduits 12 and 13 and their adjuncts, without the liability of an explosion occurring such as would take place in case the damper or door 18 was opened for this purpose.

The fuel conduit 12 communicates with the upwardly extending flues 21 which communicate with the openings 22 in the interlocking flue tiles 23 which form the bottom of the annealing chamber 24. The openings 22 communicate with the vertically extending flue tiles 25, one end of each of which is formed with a socket to receive the end of an adjacent tile, whereby the tiles are interlocked with each other. In order to maintain alinement of the tiles 25, I provide the interlocking tiles 26, which, as seen in Figures 2 and 3, serve to space the tiles 25 from each other and from the side walls of the annealing chamber 24.

27 designates corner tiles, which interlock with the adjacent tiles 25 and with the arch tiles 28, the construction of which corresponds to the tiles 25. The arch tiles are spaced from each other by means of the interlocking tiles 29, the construction of which corresponds to the construction of the tiles 26. The purpose of the interlocking tiles 26 and 29 is to not only space the different tiles from each other, but also to prevent the falling of a tile in case it should become broken. The tiles 25, 27 and 28 form a flue 30, which communicates with the flues 21 and with the ports 31 which open into the longitudinally extending flues 32, one wall of which is formed by the interlocking tiles 33, which are provided with a tongue on one side and a groove on the opposite side in order to accomplish this result. These wall tiles 33 are recessed, as at 34, in order to reduce the thickness of the tile at such point, so that the heat will more readily radiate therethrough. The tiles 33 are also provided on the opposite sides with the hemispherical recesses 35, thereby adapting the same to interlock with the ends of the regenerative or recuperative tiles 36, which latter extend transversely across the air conduit 37. The opposite wall of said conduit 37 is formed by interlocking tiles 33 which also form a wall of a discharge conduit 38, the other side wall of said discharge conduit being formed by the tiles 39. The discharge conduit 38 communicates with the stack 40. The side wall of the leer is provided with the apertured tiles 41 which communicate with the corner tiles 27 and form cleaning openings, through which a suitable implement may be inserted to clean the arch tiles, and these tiles 41 are sealed by means of a closure 42

43 designates the arch of the furnace which forms the top walls of the annealing chamber 24.

44 designates apertured tiles extending through the top arch 43 and communicating with the corner tiles 27, in order to provide for the insertion of a suitable implement between the vertical flues, and said tiles 44 are sealed by means of removable closures 45.

The flues which communicate with the fuel conduit 13 are formed in a similar manner to those which communicate with the fuel conduit 12, and a detail description thereof is therefore believed to be unnecessary. The fuel conduit 13 communicates with vertically extending flues 46, which, in turn, communicate with arch flues 47. The latter flues communicate with downwardly extending flues 49 which communicate with the longitudinally extending conduit 50. Products of combustion pass from the conduit 50 through the recuperative or regenerative tiles 51 which extend across the air conduit 52, and the products of combustion are discharged into the longitudinally extending conduit 53, which leads to the stack 54.

55 designates an air inlet closed by a door or damper 56, said inlet communicating with the air conduit 52, which latter discharges at its rear end, as at 57, into a conduit 58 which communicates by means of the passages 59 with the vertically extending flues 21 as will be best understood by reference to Figures 1 and 3.

60 designates an air inlet controlled by a door or damper 61, whereby the admission of air to the conduit 37 may be regulated as desired, the air in said conduit passing around the tiles 36, then to the downwardly extending passage 62 through the longitudinally extending conduit 64, which communicates by means of the laterally extending passage 65 with the fuel passing through the conduit 46.

The bottom of the annealing chamber 24 is provided with spaced bars 66, provided in their upper face with recesses 67, which form bearings for the journals 68 of the rollers 69. The purpose of this construction is to prevent the rollers or anti-friction devices 69 becoming fixed and inoperative, due to the presence of foreign material, and owing to the provision of the recesses 67, a sufficient amount of play is provided which prevents any foreign material from filling up the space in proximity to said rollers so that their rotation is prevented. These bars 66 extend from in proximity to the opening 70 to the discharge end 71 of the annealing chamber. The top of the discharge passage 71 is preferably formed by a series of arches 72. The trays or pans on which the articles to be annealed are placed are inserted through the opening 70, which latter may be closed by means of a door 73. The pans roll on the anti-friction devices 69. The fuel conduits 12 and 13 may be provided with openings 74 and 75, respectively, (see Figure 3) which, it will be understood are closed in case producer gas is employed, and these openings are employed for the insertion of a burner, such as for example, a fuel oil burner, in case it is desired to fire the leer in such manner.

In the operation, the fuel passes from the main fuel conduit 4 through the branch conduits 5 to the different leers, it being understood that any desired number of leers may be connected up in this manner. The air for combustion passes through the inlets 55 and 60, so that prior to its intermingling with the products of combustion, it is highly heated by the waste products of combustion. The products of combustion pass through the different flues in such a manner that the direction of the flame in one flue is in a direction reverse to that in the next adjacent flue, so that the annealing chamber is uniformly heated throughout the length thereof. The heat radiates from the flues into the annealing chamber so that the articles to be annealed do not come into contact with the flame, and I am therefore enabled to employ a temperature in the annealing chamber which is higher than that which would melt the articles to be annealed in case the flame came into direct contact therewith. The air for combustion is very highly heated, since the tiles 51 and 36 in practice become red hot. In case the products of combustion are permitted to come into direct contact with the glass being annealed, the product is often discolored and the quality of the ware affected, owing to the absorption by the glass of foreign impurities, carried by the products of combustion, such as for example, sulfur, soot, and other foreign material.

It has been deemed impractical in the methods heretofore employed to use "producer gas" for firing leers owing to the large amount of foreign impurities contained in the same, and since producer gas costs about half that of other types of fuel, the cost of the annealing operation in my present leer is reduced to about half the cost of that which is incurred in prior methods. In my present invention, the annealing furnace can be continuously operated and it is not necessary to shut down the operation at any time.

In case soot and foreign materials collects in the different flues, the gas may be ignited through the port 19 and the soot and the foreign material burnt out.

Special attention is directed to the novel manner of forming the different flues which are interlocked both longitudinally and laterally of such flues, so that they are not liable to become displaced. I also provide means for inspecting the state of combustion in each flue owing to the controllable opening communicating with the corner tiles of the flue, as seen in Figure 3, and these openings may also be used for cleaning the flues, if desired. The closures for such openings and the ports also serve as explosion ports and ports through which fluid under pressure may be introduced between the flues.

It will now be apparent that I have devised a novel and useful construction of a leer which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. An annealing furnace, comprising a series of flues located within, and surrounding the major portion of the annealing chamber in which the articles are to be annealed, and means to pass products of combustion through adjacent flues in different directions.

2. An annealing furnace, comprising a series of longitudinally interlocking flues surrounding the annealing chamber in which the articles are to be annealed, means to laterally interlock said flues, and means to pass products of combustion through adjacent flues in different directions.

3. An annealing furnace, comprising a series of flues surrounding the portion of the annealing chamber in which the articles are to be placed, regenerative tiles forming a portion of said flues, means to conduct fuel into said flues, and means to pass air around said regenerative tiles and conduct it to said flues to promote the combustion therein.

4. An annealing furnace, comprising a series of flues surrounding the portion of the annealing chamber in which the articles are to be annealed, regenerative tiles forming a portion of said flue, air conduits communicating with said series of flues, means to pass air around said regenerative tiles and into said air conduits, and means to conduct fuel into said series of flues.

5. An annealing furnace, comprising an annealing chamber and a series of flues surrounding the portion of the chamber in which the articles to be annealed are placed each of said flues being formed of interlocking tiles, and means to produce combustion in said flues.

6. An annealing furnace, comprising an annealing chamber, a series of flues surrounding the portion of the annealing chamber in which the articles to be annealed are placed, each of said flues having a controllable explosion port, and means to produce combustion in said flues.

7. An annealing furnace, comprising a frame-work forming an annealing chamber, a series of flues passing around said chamber, means to cause products of combustion to pass through one flue in one direction and through the next adjacent flue in an opposite direction, and means to utilize waste products of combustion to preheat the air employed to promote combustion.

8. An annealing furnace, comprising a frame-work forming an annealing chamber, a series of longitudinally interlocking flues extending along the sides and top of said chamber, means to laterally interlock said flues with each other to prevent displacement of the tiles thereof, longitudinally extending bottom flues communicating with said series of flues, and means to pass products of combustion through one flue in one direction and through the next adjacent flue in an opposite direction.

9. An annealing furnace, comprising a frame-work forming an annealing chamber and provided on each side with longitudinally extending fuel conduits, a series of flues extending around the portion of the annealing chamber in which the articles to be annealed are placed, one of said flues communicating with the fuel conduit on one side of the furnace and the next adjacent flue communicating with the fuel conduit at the other side of the furnace, whereby products of combustion pass through adjacent flues in opposite directions, means to feed fuel to said fuel conduits, and means to feed air to said flues.

10. An annealing furnace, comprising a frame work having an annealing chamber and an inlet and an outlet therefor, a fuel conduit at each side of the furnace, flues in proximity to the sides and top of the annealing chamber and extending beneath the bottom thereof and communicating with predetermined fuel conduits, longitudinally extending discharge flues with which said lateral flues communicate, means to introduce fuel into said fuel conduits, and means to preheat air and conduct the preheated air to said first flues.

11. An annealing furnace having a fuel conduit therebeneath, a source of fuel supply communicating therewith, a cleaning pit communicating with said fuel conduit by a port, a door controlling said port and provided with an aperture, and a closure for said aperture, whereby gases in said fuel conduit may be fired without producing an explosion in said fuel conduit.

An annealing furnace of the open leer type, having its annealing chamber heated by flues extending laterally around the portion of the chamber in which the articles to be annealed are placed, means to pass products of combustion through alternate flues in one direction and through the other flues in a reverse direction.

13. An annealing furnace, including flues having corner tubular tiles with controllable explosion ports therethrough.

14. An annealing furnace, having flues formed of interlocking tiles, adjacent tiles having recesses in the wall thereof, tubular tiles interlocked in said recesses and extending across said flues, means to conduct products of combustion to said tubular tiles, and means to pass air through said flues.

15. An annealing furnace or leer having a plurality of heating flues extending upwardly at the side and across the upper portion of the annealing chamber, said flues being located within said chamber and having the major portion of their surfaces exposed within the chamber to form heat-radiating surfaces, substantially as described.

16. An annealing furnace or leer having a plurality of heating flues extending upwardly at the side and across the upper portion of the annealing chamber, said flues being located within said chamber and having the major portion of their surface exposed within the chamber to form heat-radiating surfaces, together with means for circulating a heating medium through adjacent flues in opposite directions, substantially as described.

17. An annealing furnace, comprising an annealing chamber and a series of flues extending upwardly at the side portions of the chamber and across the upper portion thereof, said flues being located within the chamber, means for circulating the products of combustion through the said flues, recuperators connected with the outlet ends of the flues, and an air supply for the combustion leading through said recuperators, substantially as described.

18. An annealing furnace, comprising an annealing chamber, a series of flues located within and surrounding the major portion of the chamber in which the articles to be annealed are placed, means for circulating the products of combustion through adjacent flues in opposite directions, and two sets of recuperators, one set connected to the outlet end of each series of flues, together with means for leading the air for the combustion supply for each series of flues through the recuperators connected with such flues, substantially as described.

19. An annealing furnace, comprising an annealing chamber, a series of flues located within and surrounding the major portion of the chamber in which the articles to be annealed are placed, means for circulating the products of combustion through adjacent flues in opposite directions, and two sets of recuperators, one set connected to the outlet end of each series of flues, together with means for leading the air for the combustion supply for each series of flues through the recuperators connected with such flues, said recuperators being located below the floor of the annealing chamber, whereby the products of combustion passing through said recuperators are caused to transfer a portion of their remaining heat to said floor and thence to the chamber, substantially as described.

20. An annealing furnace comprising an annealing chamber, a plurality of flues extending within said chamber, means for circulating the products of combustion in opposite directions through said flues, and recuperators connected with the outlet ends of the flues, substantially as described.

21. An annealing furnace, comprising an annealing chamber, a plurality of flues extending within said chamber, means for circulating the products of combustion in opposite directions through said flues, and recuperators connected with the outlet ends of the flues, each series of flues having its own recuperator, and the two recuperators having separate stack connections, substantially as described.

22. An annealing furnace, comprising an annealing chamber, a series of flues located within and surrounding the major portion of the annealing chamber, means for passing the products of combustion through alternate flues in one direction and through the other flues in the reverse direction, and means for separately regulating the draft and combustion conditions in the two sets of flues, substantially as described.

23. An annealing furnace, comprising an annealing chamber, flues extending upwardly within opposite sides of said chamber and across the upper portion thereof, means for circulating a heating medium through some of said flues in one direction and through other of the flues in the opposite direction, and means connected with the outgoing ends of the flues for preheating the air supply for the heating medium, substantially as described.

24. An annealing furnace, comprising an annealing chamber, flues extending upwardly within opposite sides of said chamber and across the upper portion thereof, means for circulating a heating medium through some of said flues in one direction and through other of the flues in the opposite direction, and means connected with the outgoing ends of the flues for preheating the air supply for the heating medium, said preheating means being located underneath the floor of the annealing chamber, substantially as described.

25. An annealing furnace or leer comprising an annealing chamber, two sets of heating flues extending within said chamber, means for circulating a heating medium through some of said flues in one direction and through other of the flues in a reverse direction, and means whereby the circulation in the different flues may be separately controlled, substantially as described.

26. An annealing furnace or leer comprising an annealing chamber having two sets of flues extending within and surrounding at least a major portion of that portion of the chamber in which the articles to be annealed are placed, said flues being arranged in separate series, each series of flues having its own means for producing combustion and its own stack connection, substantially as described.

27. An annealing furnace or leer comprising an annealing chamber having two sets of flues extending within and surrounding at least a major portion of that portion of the chamber in which the articles to be annealed are placed, said flues being arranged in separate series, each series of flues having its own means for producing combustion and its own stack connection, and air recuperators located in the stack connection of each series of flues, substantially as described.

28. An annealing furnace, comprising an annealing chamber having a plurality of heating flues leading through said chamber, said flues being arranged in different sets, means for circulating a heating medium through different flues in different directions, stack connections extending underneath the central portion of the annealing chamber, passages leading from said connections to the outlet ends of the flues, and recuperators located in said passages, substantially as described.

29. An annealing furnace comprising an annealing chamber, and a series of flues extending within the chamber and around that portion thereof in which the articles to be annealed are placed, said flues being arranged in two sets, the flues of each set having separate connections with a source of air and gas supply, substantially as described.

30. An annealing furnace, comprising an annealing chamber, a series of flues extending within the chamber and around that portion thereof in which the articles to be annealed are placed, said flues being arranged in two sets, the flues of each set having separate connections with a source of air and gas supply, and each series of flues having a separate stack connection, and air preheating means located in such stack connections, substantially as described.

31. An annealing leer for hot glass articles, comprising a heated furnace portion at the entry end of the leer and a tunnel portion having a gradually decreasing temperature extending therefrom to the exit end of the leer, the leer being arranged for continuous movement of the articles through the heated and tunnel portions to anneal the same in a gradually decreasing temperature, the furnace portion comprising a muffle chamber with an open end leading into the tunnel extension, flues surrounding the muffle portion of the leer chamber in which the ariticles to be annealed are placed, the side portions of which consist of a plurality of vertically extending flues, said flues being formed of interlocking tiles, an air and gas supply to the flue system, connections within the furnace structure for directing the flame and products therefrom substantially evenly on both sides of the muffle in the side flues, a conduit system beneath the heated muffle chamber in heating relation to its floor, said system receiving the products of combustion from the side flues and leading the said products of combustion in a horizontal longitudinal flow to stack connections, said stack connections being out of the path of travel of the articles being annealed and intermediate the length of the leer and adjacent the end of the heated portion, substantially as described.

32. An annealing leer for hot glass articles, comprising a heated furnace portion at the entry end of the leer and a tunnel portion having a gradually decreasing temperature extending therefrom to the exit end of the leer, the leer being arranged for continuous movement of the articles through the heated and tunnel portions to anneal the same in a gradually decreasing temperature, the furnace portion comprising a muffle chamber with an open end leading into the tunnel extension, flues surrounding the muffle portion of the leer chamber in which the articles to be annealed are placed, the side portions of which consist of a plurality of vertically extending flues, said flues being formed of interlocking tiles, an air and gas supply to the flue system, connections within the furnace structure for directing the flame and products therefrom substantially evenly on both sides of the muffle in the side flues, a conduit system beneath the heated muffle chamber in heating relation to its floor, said system receiving the products of combustion from the side flues and leading the said products of combustion in a horizontal longitudinal flow to stack connections, said stack connections including upwardly extending flues in the side walls of the leer out of the path of travel of the articles being annealed and intermediate the length of the leer and adjacent the end of the heated portion, substantially as described.

LEWIS STEELMAN.